(12) United States Patent
Schaefer (10) Patent No.: US 12,516,954 B2
(45) Date of Patent: Jan. 6, 2026

(54) ROAD GRAPH GENERATION

(71) Applicant: Toyota Jidosha Kabushiki Kaisha, Toyota (JP)

(72) Inventor: Alexander Christoph Schaefer, Fremont, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 91 days.

(21) Appl. No.: 18/428,870

(22) Filed: Jan. 31, 2024

(65) Prior Publication Data

US 2025/0244141 A1    Jul. 31, 2025

(51) Int. Cl.
*G01C 21/00* (2006.01)

(52) U.S. Cl.
CPC ...... *G01C 21/3815* (2020.08); *G01C 21/3811* (2020.08); *G01C 21/3867* (2020.08)

(58) Field of Classification Search
CPC ............ G01C 21/3811; G01C 21/3815; G01C 21/38–3896; G01C 21/00; G06F 16/29; G06F 30/18–20; G08G 1/0125–0133; G08G 1/0112; G08G 1/00
USPC .................................................. 701/400–541
See application file for complete search history.

(56) References Cited

U.S. PATENT DOCUMENTS

| | | |
|---|---|---|
| 11,566,906 B2 | 1/2023 | Mubarek et al. |
| 11,698,272 B2 | 7/2023 | Kroepfl et al. |
| 2007/0297374 A1 * | 12/2007 | El-Damhougy ...... H04W 40/24 370/338 |
| 2021/0063200 A1 * | 3/2021 | Kroepfl .............. G01C 21/3867 |
| 2021/0095975 A1 * | 4/2021 | Mubarek .............. G08G 1/0141 |
| 2025/0104447 A1 * | 3/2025 | Schaefer .............. G06V 20/588 |

FOREIGN PATENT DOCUMENTS

| | | | | |
|---|---|---|---|---|
| CN | 103353991 B | * | 2/2016 | |
| CN | 115018008 A | * | 9/2022 | ........... G06Q 10/083 |
| WO | WO-2009092812 A1 | * | 7/2009 | ......... G01C 21/3446 |

OTHER PUBLICATIONS

Liu, Yue-hu—English description of CN-103353991-B via Espacenet Patent Translate, retrieved Jun. 23, 2025 (Year: 2025).*

(Continued)

*Primary Examiner* — Erin M Piateski
*Assistant Examiner* — Paul Allen
(74) *Attorney, Agent, or Firm* — Christopher G. Darrow; Darrow Mustafa PC (57) ABSTRACT

Systems, methods, and other embodiments described herein relate to generating a road graph from a frame graph. In one embodiment, a method includes receiving a frame graph of a region. The frame graph includes a plurality of points and a plurality of edges connecting the plurality of points based on at least one predetermined criterion. The method further includes generating a plurality of shortest paths. The plurality of shortest paths includes a shortest path between each two of the plurality of points connected by one or more of the plurality of edges. The method includes selecting the longest path from the plurality of shortest paths and generating a road graph based on at least the longest path. the road graph identifying one or more roadways in the region.

20 Claims, 6 Drawing Sheets

(56) References Cited

OTHER PUBLICATIONS

Song, Yan-zhi—English description of CN-115018008-A via Espacenet Patent Translate, retrieved Jun. 18, 2025 (Year: 2025).*
Nannicini Giacomo—English description of WO-2009092812-A1 via Espacenet Patent Translate, retrieved Sep. 11, 2025 (Year: 2025).*

* cited by examiner

ROAD GRAPH GENERATION

TECHNICAL FIELD

The subject matter described herein relates, in general, to systems and methods for generating a road graph that identifies one or more roadways in a region from a frame graph of the region.

BACKGROUND

Points, such as trace points, include sensor information about a road. However, for points distributed over a region of interest, where the region of interest includes multiple roads, it may be difficult to determine the topology and geometry of the road network in the region of interest, particularly in a case where the multiple roads are side-by-side or stacked on top of each other. Processing a point map into a format that is useful for data analysis can be both labor and resource intensive and inaccurate.

SUMMARY

In one embodiment, a system for generating a road graph from a frame graph is disclosed. The system includes a processor and a memory in communication with the processor. The memory stores machine-readable instructions that, when executed by the processor, cause the processor to receive a frame graph of a region. The frame graph includes a plurality of points and a plurality of edges connecting the plurality of points based on at least one predetermined criterion. The machine-readable instructions further include machine-readable instructions that, when executed by the processor, cause the processor to generate a plurality of shortest paths. The plurality of shortest paths includes a shortest path between each two of the plurality of points connected by one or more of the plurality of edges. The machine-readable instructions further include machine-readable instructions that, when executed by the processor, cause the processor to select the longest path from the plurality of shortest paths and generate a road graph based on at least the longest path. The road graph identifies one or more roadways in the region.

In another embodiment, a method for generating a road graph from a frame graph is disclosed. The method includes receiving a frame graph of a region. The frame graph includes a plurality of points and a plurality of edges connecting the plurality of points based on at least one predetermined criterion. The method further includes generating a plurality of shortest paths. The plurality of shortest paths includes a shortest path between each two of the plurality of points connected by one or more of the plurality of edges. The method includes selecting the longest path from the plurality of shortest paths and generating a road graph based on at least the longest path. The road graph identifies one or more roadways in the region.

In another embodiment, a non-transitory computer-readable medium for generating a road graph from a frame graph is disclosed. The non-transitory computer-readable medium includes instructions that, when executed by a processor, cause the processor to perform one or more functions. The instructions include instructions to receive a frame graph of a region. The frame graph includes a plurality of points and a plurality of edges connecting the plurality of points based on at least one predetermined criterion. The instructions include instructions to generate a plurality of shortest paths. The plurality of shortest paths includes a shortest path between each two of the plurality of points connected by one or more of the plurality of edges. The instructions include instructions to select the longest path from the plurality of shortest paths and generate a road graph based on at least the longest path. The road graph identifies one or more roadways in the region.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with systems and methods for generating a road graph from a frame graph are disclosed. A frame graph is a dense graph of points and edges connecting the points. The points may originate from sensor data and may include information about a particular point in a region of interest. A point may have metadata that includes a geographical location and various environmental conditions associated with the geographical location. The environmental conditions may include an elevation level, a humidity level, a temperature level, a road gradient level, and/or a light level. Frame graphs are useful for vehicle navigation, orientation, autonomous driving, pedestrian movement, and/or cycle movement. However, it is also useful to utilize a road graph which identifies one or more roadways in a region. The road graph models the topology of a road network and may be used for route planning and navigation. Systems providing services such as navigation services can provide more accurate information when the roadways within a region are identified. Such systems can more easily utilize a road graph to distinguish between roads at various locations.

Current methods of generating a road graph from a frame graph can be labor-intensive, time-consuming, expensive, and require extensive storage and computational resources, as the prior art discloses ingesting aerial maps and manually annotating the aerial maps. These methods can be resource-intensive, time-consuming, expensive, and have high levels of inaccuracies.

Accordingly, systems, methods, and other embodiments associated with generating a road graph from a frame graph are disclosed. The system receives a frame graph, which includes the points (also referred to as a frame graph node in the context of graph theory) and the edges, based on the points meeting predetermined criteria. The system may then generate a plurality of shortest paths between each two points that are connected in the frame graph. The shortest path is based on the shortest distance between each two points that are connected in the frame graph. Additionally and/or alternatively, the shortest path may refer to any other suitable metric such as the shortest travel time between two points or the least amount of traffic between two points. The system may compare all the shortest paths that have been generated and select the longest of the shortest paths. The system may then generate a road graph with the selected longest of the shortest paths as a roadway in the region. The system may output or transmit the road graph to another entity such as a navigation database.

Further, the system may determine a minimum road graph branch length based on, as an example, user input, and may generate a perimeter surrounding the generated roadway and distanced from the roadway by the minimum road graph branch length. The perimeter does not include the road graph itself. The minimum road graph length may be a distance between each frame graph node and the road graph and may be determined as the corresponding shortest path length or another distance metric such as the Euclidean distance between the frame graph nodes and the generated roadway. The system may determine whether a portion of the frame graph lies outside the perimeter. In a case where there is a portion of the frame graph outside the perimeter, the system may again carry out the steps of generating a plurality of shortest paths for the portion of the frame graph outside the perimeter and selecting the longest path from among the generated shortest paths. The system may update the road graph to include the additional longest path(s). The system may then repeat the step of generating a perimeter surrounding the generated roadways in the updated road graph and determining whether a portion of the frame graph remains outside the perimeter until there is no portion of the frame graph outside the perimeter. In other words, the system considers the whole frame graph and selects the longest shortest path that satisfies two conditions, which include the path may not originate from and/or terminate at a point (or a node) that is within the perimeter and the path points (or nodes) that are in between the originating and terminating points (or nodes) may not be road graph points (or nodes).

The embodiments disclosed herein present various advantages over conventional technologies. First, the embodiments can provide a more accurate prediction of the characteristics of the roadways, merging roads, splitting roads, and intersections. Second, the embodiments are less resource-intensive, more cost effective, and more time effective than the prior art.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIGS. 1A-1F illustrate an example of generating a road graph 104 from a frame graph 102. A road graph generating system 100 receives a frame graph 102. The frame graph 102 includes a plurality of points 106 and a plurality of edges 108 connecting the plurality of points 106 based on at least one predetermined criterion. The frame graph 102 may originate from sensor data from any suitable sensors. As an example, the sensor data may be from mobile sensors such as vehicle sensors and/or stationary sensors such as roadside sensors or infrastructure sensors.

Figure 1A:
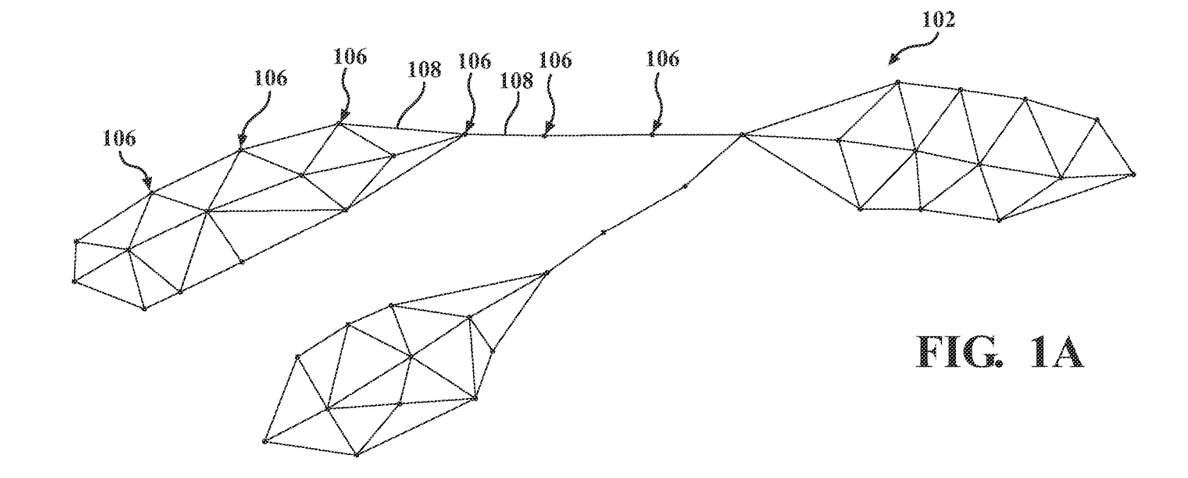
FIGS. 1A-1F illustrate an example of generating a road graph from a frame graph.

As an example and as shown in FIG. 1A, the frame graph 102 includes points 106. The points 106 are distributed within a region. The points 106 may have metadata that includes details such as the source of sensor data, geographical location in terms of coordinates, and environmental conditions such as elevation levels, light levels, humidity levels, temperature levels, and/or precipitation levels. The points 106 may be trace points which identify the positions of a vehicle travelling along a roadway. As an example, each point 106 may indicate a position of a vehicle along the roadway when the sensor data is captured. The points 106 may originate from a single vehicle travelling along a roadway. Alternatively, the points 106 may originate from two or more vehicles travelling along one or more roadways.

The sensor data may include left key points, which identify a left boundary of a roadway that the vehicle is traveling on and right key points, which identify a right boundary of the roadway that the vehicle is traveling on. Each point 106 may be the center of the roadway. More specifically, each point 106 may be the center point between a left key point and a right key point. As another example, the sensor data may include a field of view and each point 106 may be a centroid of the field of view.

As previously mentioned, and as shown, the frame graph 102 includes edges 108. Each edge 108 connects two points 106 in the frame graph 102 based on at least one predetermined criterion. Each edge 108 represents a drivable connection between two points 106. The predetermined criterion may include two points 106 having a common vehicle source, two points 106 having a distance from each other that is less than a predetermined distance, two points 106 having a gradient between each other that is less than a predetermined percentage, two points 106 having fields of view that have an altitude difference that is less than a predetermined height, and two points 106 having fields of view that have an overlapping portion and the overlapping portion is more than a predetermined value.

In the example of the predetermined criterion including two points 106 that have a common vehicle source, the frame graph 102 may include the edges 108 between two points 106 that originated from a single vehicle or a single vehicle sensor. In the example of the predetermined criterion including two points 106 having a distance from each other that is less than a predetermined distance, the frame graph 102 may include the edges 108 between two points 106 that are less than a predetermined distance, e.g., 50 meters, away from each other.

In the example of the predetermined criterion, including two points 106 having a gradient between each other that is less than a predetermined percentage, the frame graph 102 may include the edges 108 between two points 106 that have a gradient that is less than the predetermined percentage, e.g., 10%. In the example of the predetermined criterion including two points 106 having fields of view that have an altitude difference that is less than a predetermined height, the frame graph 102 may include the edges 108 between two points 106 that have less than the predetermined height difference, e.g., 20 meters.

The frame graph 102 may include points 106 and edges 108 that meet one or more of the predetermined criteria. Alternatively, the frame graph 102 may include points 106 and edges 108 that meet all the predetermined criteria.

Figure 1B:
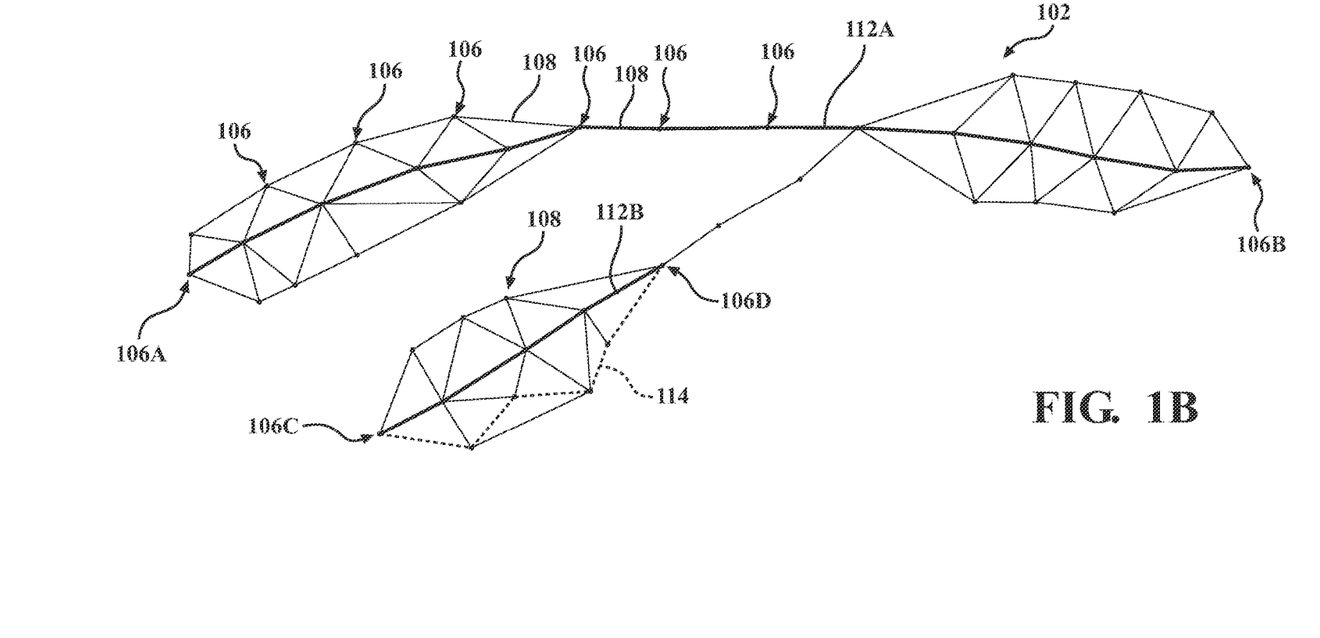

FIG. 1B illustrates an example of generating a plurality of shortest paths 112A, 112B (collectively known as 112) and selecting the longest path 112A from the plurality of shortest paths 112. The plurality of shortest paths 112 includes a shortest path between each two of the plurality of points 106 connected by one or more of the plurality of edges 108. The shortest path 112 between each two points 106 may be based on distance.

In FIG. 1B, to avoid overcrowding, not all the shortest paths in the frame graph 102 are shown. Examples of the paths 112, 114 that include edges 108 connecting points 106 are shown. A first path 112A connects a first set of two points 106A, 106B and is the shortest path between the first set of two points 106A, 106B using the edges 108. A second path 114 connects a second set of two points 106C, 106D and a third path 112B also connects the second set of two points 106C, 106D. However and as shown in FIG. 1B, the second path 114 is not the shortest path between the second set of two points 106C, 106D as the second path 114 includes additional edges 108 connecting several points 106. The third path 112B is the shortest path between the two points 106C, 106D with less edges 108 and less intermediate points 106 between the second set of two points 106C, 106D. Overall, the first path 112A is longest of the shortest paths 112 between each set of two points 106.

As such, the road graph generating system 100 connects each two points 106 in the frame graph 102, forming the shortest path 112A, 112B between the two points 106. The road graph generating system 100 then selects the longest 112A of the shortest paths 112A, 112B. The road graph generating system 100 identifies the longest path 112A as a roadway 124 and may generate a road graph 104 that includes the longest path 112A as a roadway 124.

Figure 1C:
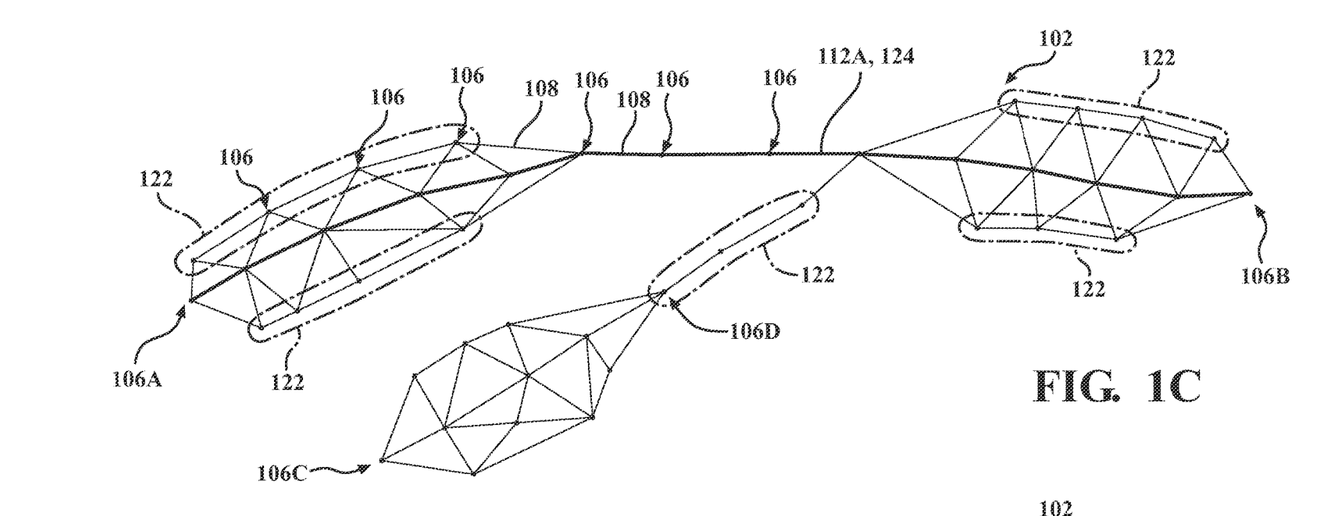

FIG. 1C illustrates an example of determining a minimum road graph branch length based on at least one second predetermined criteria and generating a perimeter 122 surrounding the identified one or more roadways 124. The perimeter 122 is distanced from the identified one or more roadways 124 by the minimum road graph branch length. As previously mentioned, the minimum road graph length may be a distance between each point 106 and the identified roadway 124 and may be determined as the corresponding shortest path length or another distance metric such as the Euclidean distance between the frame graph nodes and the generated roadway 124.

The road graph generating system 100 may determine a minimum road graph branch length based on at least one second predetermined criterion. The minimum road graph branch length is the minimum distance that would be considered a road. As such and as an example, if the minimum road graph branch length is 20 meters, any one or more paths 112 that are less than 20 meters would not be considered a road and any one or more edges 108 that are equal to, or more than 20 meters may be considered a road.

As an example, the at least one second predetermined criterion may be based on a predetermined distance. In such an example, the minimum road graph branch length may be a predetermined distance such as 20 meters as previously mentioned. As another example, the at least one second predetermined criterion may be based on one or more characteristics of the one or more roadways 124 in the region. In such an example, the minimum road graph branch length may be based on an average or a typical road length in the associated region. As another example, the at least one second predetermined criterion may be based on user input. In such an example, a user may input a preferred minimum road graph branch length. As another example, the at least one second predetermined criterion may be based on feedback. In such an example, the road graph generating system 100 may select a predetermined distance and may generate a perimeter 122 around the identified roadways 124 such that the perimeter 122 is distanced from the identified roadways by the predetermined distance. The road graph generating system 100 may then determine how many locations at which the edges 108 and points 106 within the perimeter 122 are extending outside the perimeter 122. The road graph generating system 100 may compare the number of locations to a predetermined value and based on whether the number of locations are less, equal to, or more than the predetermined value, the road graph generating system 100 may adjust the perimeter 122. The road graph generating system 100 may adjust the perimeter 122 until the relationship between the number of locations and the predetermined value is satisfactory. As an example, in a case where the predetermined distance is 1 meter and the predetermined value is set to 10, the road graph generating system 100 may generate a perimeter 122 around the identified roadway 124 where the perimeter 122 is distanced from the roadway 124 by 1 meter. In such a case, multiple locations may extend past the perimeter 122 and the number of locations extending past the perimeter 122 exceeds the predetermined value of 10. As such, the road graph generating system 100 may increase the distance between the perimeter 122 and the roadway 124 to, as an example, 20 meters. In such an example and as shown in FIG. 1C, the points 106 and edges 108 extend past the perimeter 122 at one location, which is less than the predetermined value of 10. As such, the road graph generating system 100 may set the minimum road graph branch length to the increased value of 20 meters. The road graph generating system 100 may then generate a perimeter 122 around the identified roadways 124 where the perimeter 122 is distanced from the roadway 124 by the minimum road graph branch length.

Figure 1D:
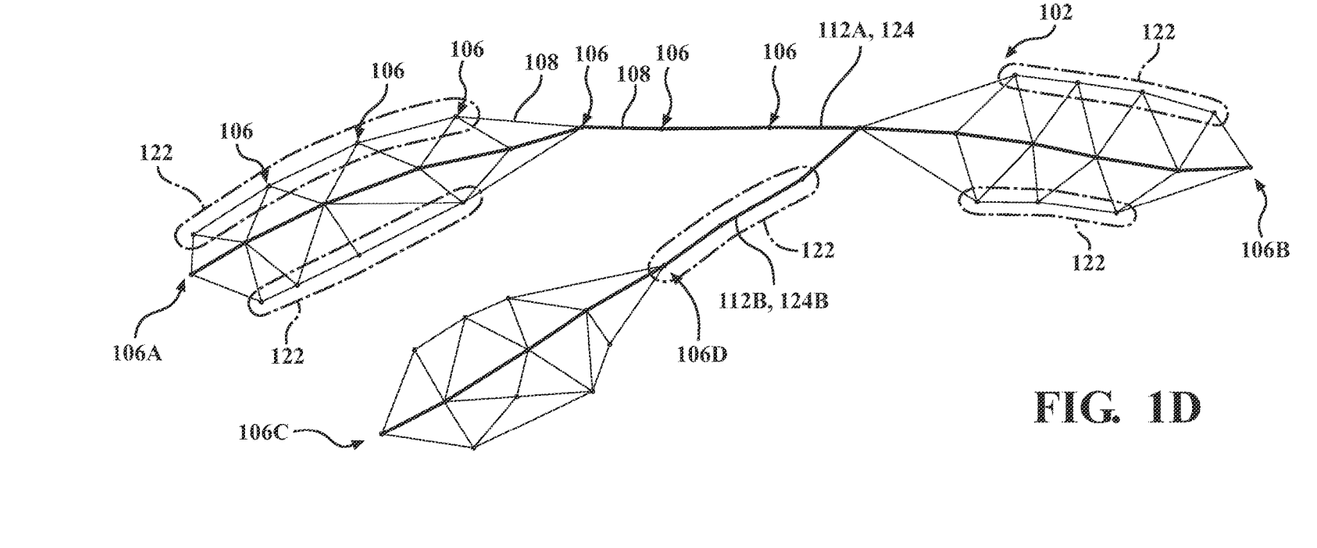

FIG. 1D illustrates determining whether there is a portion of the frame graph 102 that is outside the perimeter 122 and in response to whether there is a portion of the frame graph 102 that is outside the perimeter 122, generating a second plurality of shortest paths and selecting the second longest path 112B from the second plurality of shortest paths. Similar to the plurality of shortest paths as described above, the second plurality of shortest paths includes a shortest path between each two of the plurality of points 106 connected by the one or more of the plurality of edges 108, where the each two of the second plurality of points 106 are in the portion of the frame graph 102 that is outside the perimeter 122 and where none of the points 106 of the path except for the first and last one are part of the road graph.

As an example, the road graph generating system 100 may identify a portion of the frame graph 102 that exists outside of the perimeter 122 or extends past the perimeter 122 using any suitable method such as a graph traversal method or an image processing method. In response to identifying a portion of the frame graph 102 that is outside the perimeter 122, the road graph generating system 100 may then generate a second plurality of shortest paths or reuse the remaining shortest paths, as disclosed above, for the portion of the frame graph 102 outside the perimeter, similar to the plurality of shortest paths as described above. The road graph generating system 100 may then select the second longest path 112B from the second plurality of shortest paths, similar to the longest path 112A as described above. The road graph generating system 100 may then update the road graph 104 to include the second longest path 112B.

Figure 1E:
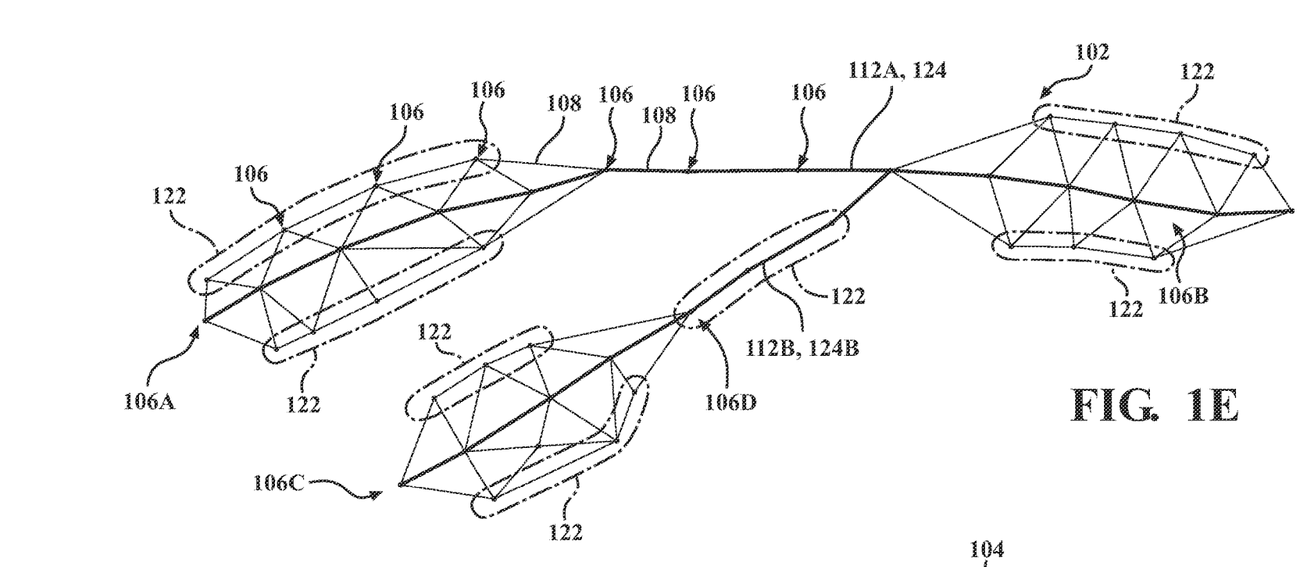

FIG. 1E illustrates generating a second perimeter 122B surrounding the second longest path 112B and determining whether there is a portion of the frame graph 102 that is outside the second perimeter 122B. As shown, there is no portion of the frame graph 102 that is outside the first and second perimeters 122, 122B. In a general case, the road graph generating system 100 may continue to cycle through the following steps of generating a perimeter 122, 122B surrounding the identified roadways 124, 124B, determining whether there is a portion of the frame graph 102 that is outside the perimeter(s) 122, 122B, and in the case where there is a portion of the frame graph 102 that is outside the perimeter(s) 122, 122B, generating an additional plurality of shortest paths 112 or reusing the previously generated shortest paths 112, selecting an additional longest path 112B from the additional plurality of shortest paths 112, and updating the road graph 104 to include the additional longest path 112B. In the case where there is no portion of the frame graph 102 that is outside the perimeter(s) 122, 122B, the road graph generating system 100 ceases to generate additional plurality of shortest paths 112 and continue the subsequent steps.

Figure 1F:
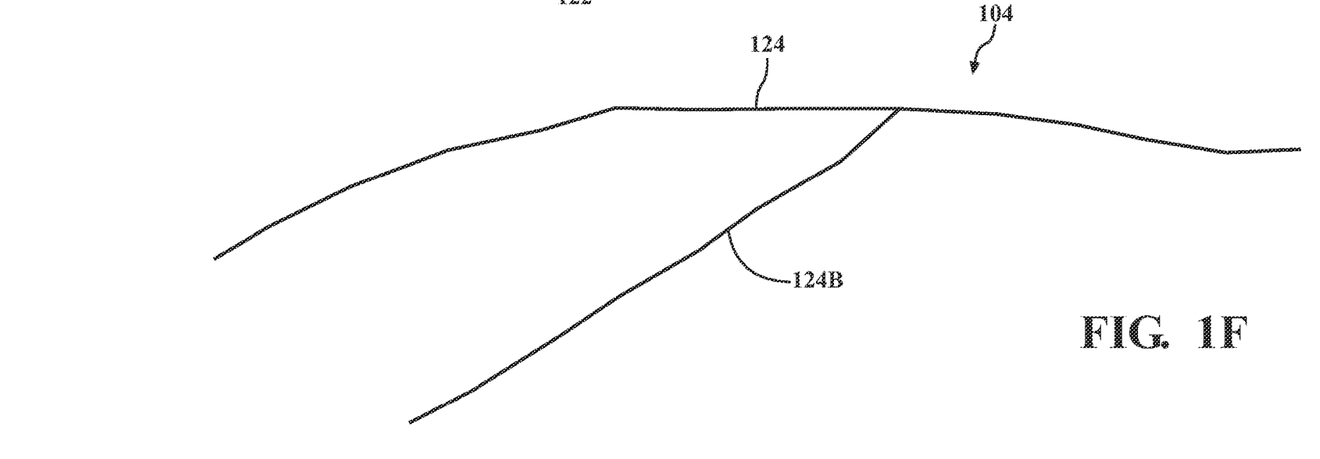

FIG. 1F illustrates an example of a resulting road graph 104 with the identified roadways 124, 124B in the region. As previously mentioned, the identified roadways 124, 124B are based on the longest paths 112A, 112B previously selected.

Figure 2:
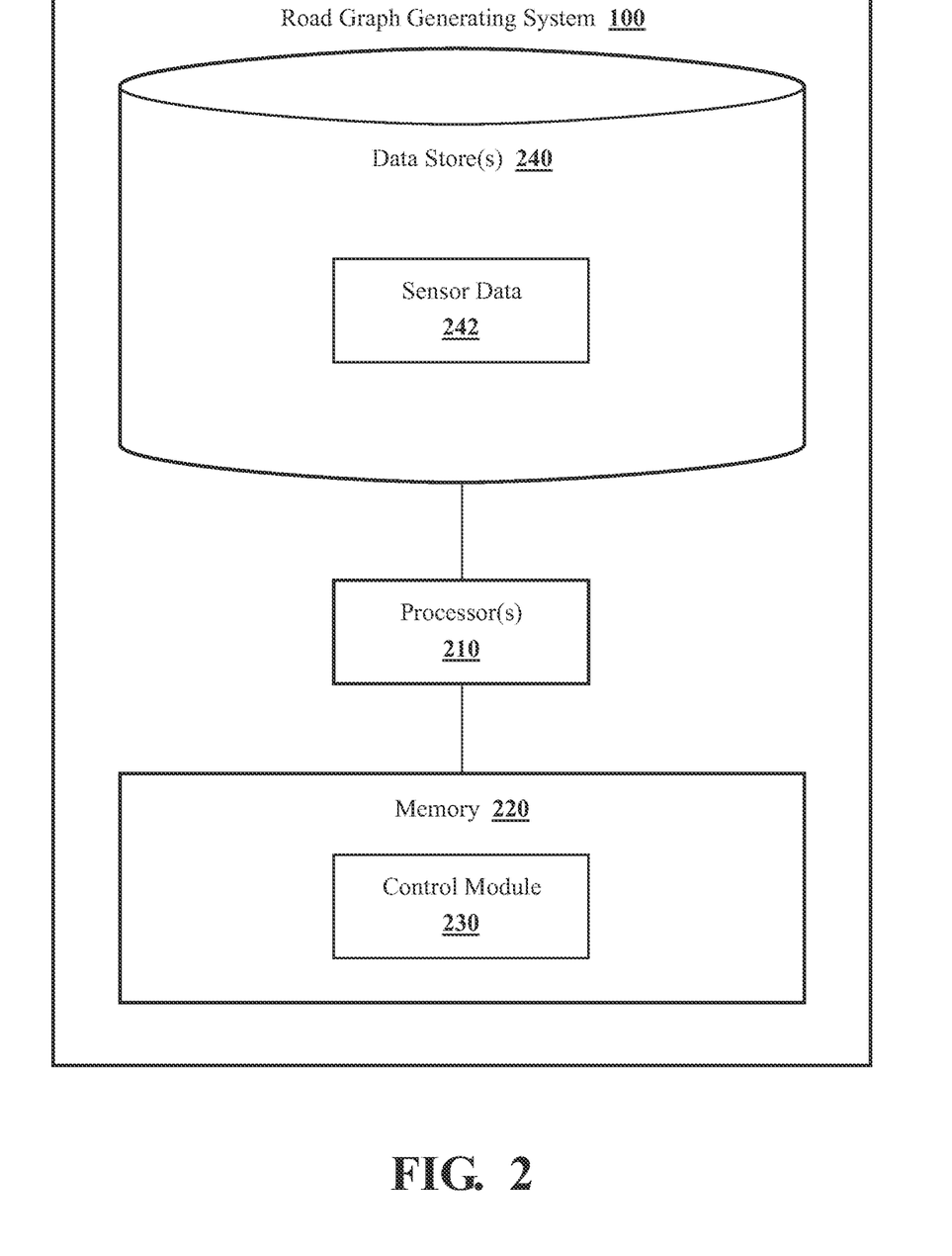
FIG. 2 illustrates one embodiment of the road graph generating system 100.

With reference to FIG. 2, one embodiment of the road graph generating system 100 of FIGS. 1A-1F is further illustrated. The road graph generating system 100 is shown as including a processor 210. Accordingly, the processor 210 may be a part of the road graph generating system 100 or the road graph generating system 100 may access the processor 210 through a data bus or another communication path. In one or more embodiments, the processor 210 is an application-specific integrated circuit (ASIC) that is configured to implement functions associated with a control module 230. In general, the processor 210 is an electronic processor, such as a microprocessor, which is capable of performing various functions as described herein.

In one embodiment, the road graph generating system 100 includes a memory 220 that stores the control module 230 and/or other modules that may function in support of generating a road graph 104 from a frame graph 102. The memory 220 is a random-access memory (RAM), read-only memory (ROM), a hard disk drive, a flash memory, or another suitable memory for storing the control module 230. The control module 230 is, for example, machine-readable instructions that, when executed by the processor 210, cause the processor 210 to perform the various functions disclosed herein. In further arrangements, the control module 230 is a logic, integrated circuit, or another device for performing the noted functions that includes the instructions integrated therein.

Furthermore, in one embodiment, the road graph generating system 100 includes a data store 240. The data store 240 is, in one arrangement, an electronic data structure stored in the memory 220 or another data store, and that is configured with routines that can be executed by the processor 210 for analyzing stored data, providing stored data, organizing stored data, and so on. Thus, in one embodiment, the data store 240 stores data used by the control module 230 in executing various functions.

For example, as depicted in FIG. 2, the data store 240 includes the sensor data 242 along with, for example, other information that is used and/or produced by the control module 230. The sensor data 242 includes information about the points 106 and may further include metadata related to the points 106. Vehicle sensors and/or any other suitable sensors may detect the points 106.

While the road graph generating system 100 is illustrated as including the various data elements, it should be appreciated that one or more of the illustrated data elements may not be included within the data store 240 in various implementations and may be included in a data store that is external to the road graph generating system 100. In any case, the road graph generating system 100 stores various data elements in the data store 240 to support functions of the control module 230.

In one embodiment, the control module 230 includes instructions that, when executed by the processor(s) 210, cause the processor(s) 210 to receive a frame graph 102 of a region. The frame graph 102 includes a plurality of points 106 and a plurality of edges 108 connecting the plurality of points 106 based on at least one predetermined criterion. In one or more arrangements, the control module 230 receives the frame graph 102 of the region from any suitable entity such as a map database. As previously disclosed, each of the plurality of points 106 may be at least one of a position of a vehicle along a roadway or a representation of a field of view.

The at least one predetermined criterion may be two points 106 having a common vehicle source, two points 106 having a distance from each other that is less than a predetermined distance, two points 106 having a gradient between each other that is less than a predetermined percentage, two points 106 having fields of view that have an altitude difference that is less than a predetermined height, and/or two points 106 having fields of view that have an overlapping portion and the overlapping portion is more than a predetermined value.

In one embodiment, the control module 230 includes instructions that, when executed by the processor(s) 210, cause the processor(s) 210 to generate a plurality of shortest paths 112 based on the connected points 106 in the frame graph 102 and select the longest path 112A from the plurality of shortest paths 112. The plurality of shortest paths 112 includes a shortest path between each two of the plurality of points 106 connected by one or more of the plurality of edges 108. As previously explained, the control module 230 may generate the shortest path 112A between each two of the points 106 based on the shortest distance between the two points 106 connected by edges 108 and may further select the longest path 112A from the plurality of shortest paths 112.

In one embodiment, the control module 230 includes instructions that, when executed by the processor(s) 210, cause the processor(s) 210 to determine a minimum road graph branch length based on at least one second predetermined criterion. The at least one second predetermined criterion may be based on a predetermined distance, one or more characteristics of the one or more roadways 124 in the region, and/or user input.

In one embodiment, the control module 230 includes instructions that, when executed by the processor(s) 210, cause the processor(s) 210 to generate a perimeter 122 surrounding the identified one or more roadways 124 and determine whether there is a portion of the frame graph 102 that is outside the perimeter 122. The perimeter 122 is distanced from the identified one or more roadways 124 by the minimum road graph branch length. In one or more arrangements, the control module 230 may generate a perimeter 122 surrounding the identified roadway(s) 124 where the perimeter 122 is distanced from the roadway 124 by the minimum road graph branch length. The control module 230 may then determine whether there is a portion of the frame graph 102 outside the perimeter 122 using any suitable method.

In one embodiment, the control module 230 includes instructions that, when executed by the processor(s) 210, cause the processor(s) 210 to, in response to whether there is a portion of the frame graph 102 that is outside the perimeter, generate a second plurality of shortest paths 112, select the second longest path 112B from the second plurality of shortest paths 112, and update the road graph 104 based on at least the second longest path 112B. As previously mentioned, the second plurality of shortest paths 112 includes a shortest path between each two of the plurality of points 106 connected by the one or more of the plurality of edges 108 and the each two of the second plurality of points 106 are in the portion of the frame graph 102 that is outside the perimeter 122.

In one or more arrangements, the control module 230 may, in response to a portion of the frame graph 102 being outside the perimeter(s) 122, generate the second plurality of shortest paths 112 based on the portion of the frame graph 102 that is outside the perimeter 122, select the second longest path 112B from the second plurality of shortest paths 112, and update the road graph 104 based on at least the second longest path 112B, as previously mentioned. The control module 230 may repeat this process until there is no portion of the frame graph 102 outside the perimeter(s) 122, resulting in the road graph 104.

In one embodiment, the control module 230 includes instructions that, when executed by the processor(s) 210, cause the processor(s) 210 to output the road graph 104 to an entity. In one or more arrangements, the control module 230 may generate the road graph 104 and output the road graph 104 in any suitable format to an entity such as a map database or a traffic database.

Figure 3:
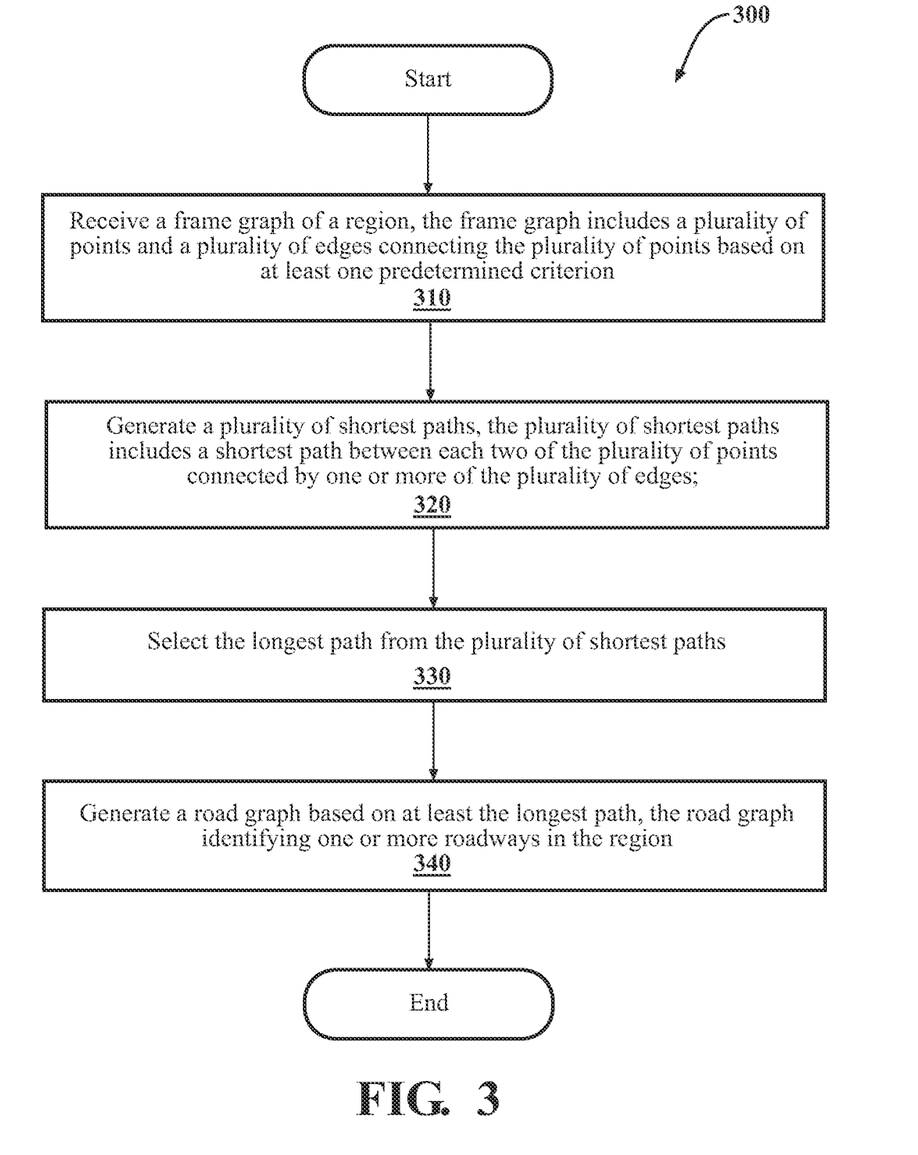
FIG. 3 is a flowchart illustrating one embodiment of a method associated with generating a road graph from a frame graph.

FIG. 3 is a flowchart illustrating one embodiment of a method 300 associated with generating a road graph 104 from a frame graph 102. The method 300 will be described from the viewpoint of the road graph generating system 100. However, the method 300 may be adapted to be executed in any one of several different situations and not necessarily by the road graph generating system 100.

At step 310, the control module 230 may cause the processor(s) 210 to receive a frame graph 102 of a region and the frame graph 102 includes a plurality of points 106 and a plurality of edges 108 connecting the plurality of points 106 based on at least one predetermined criterion. As previously mentioned, the points 106 may indicate the position of a vehicle along a roadway and the at least one predetermined criterion may include two points 106 having a common vehicle source, two points 106 having a distance from each other that is less than a predetermined distance, two points 106 having a gradient between each other that is less than a predetermined percentage, two points 106 having fields of view that have an altitude difference that is less than a predetermined height, and/or two points 106 having fields of view that have an overlapping portion and the overlapping portion is more than a predetermined value. Also, as previously mentioned, the control module 230 may receive the frame graph 102 from a database such as a map database and/or traffic database.

At step 320, the control module 230 may cause the processor(s) 210 to generate a plurality of shortest paths 112. As previously mentioned, the plurality of shortest paths 112 includes a shortest path between each two of the plurality of points 106 connected by one or more of the plurality of edges 108. The control module 230 may generate the plurality of shortest path 112 as disclosed above.

At step 330, the control module 230 may cause the processor(s) 210 to select the longest path 112a from the plurality of shortest paths 112. As an example, the control module 230 may compare the lengths of each of the plurality of shortest paths 112 and select the longest path 112A.

At step 340, the control module 230 may cause the processor(s) 210 to generate a road graph 104 based on at least the longest path 112A, where the road graph 104 identifies one or more roadways 124 in the region. As such, the control module 230 may generate the road graph 104 where the control module 230 identifies the longest path 112A as a roadway 124. The control module 230 may then output the road graph 104 to an entity such as a database in any suitable format.

Figure 4:
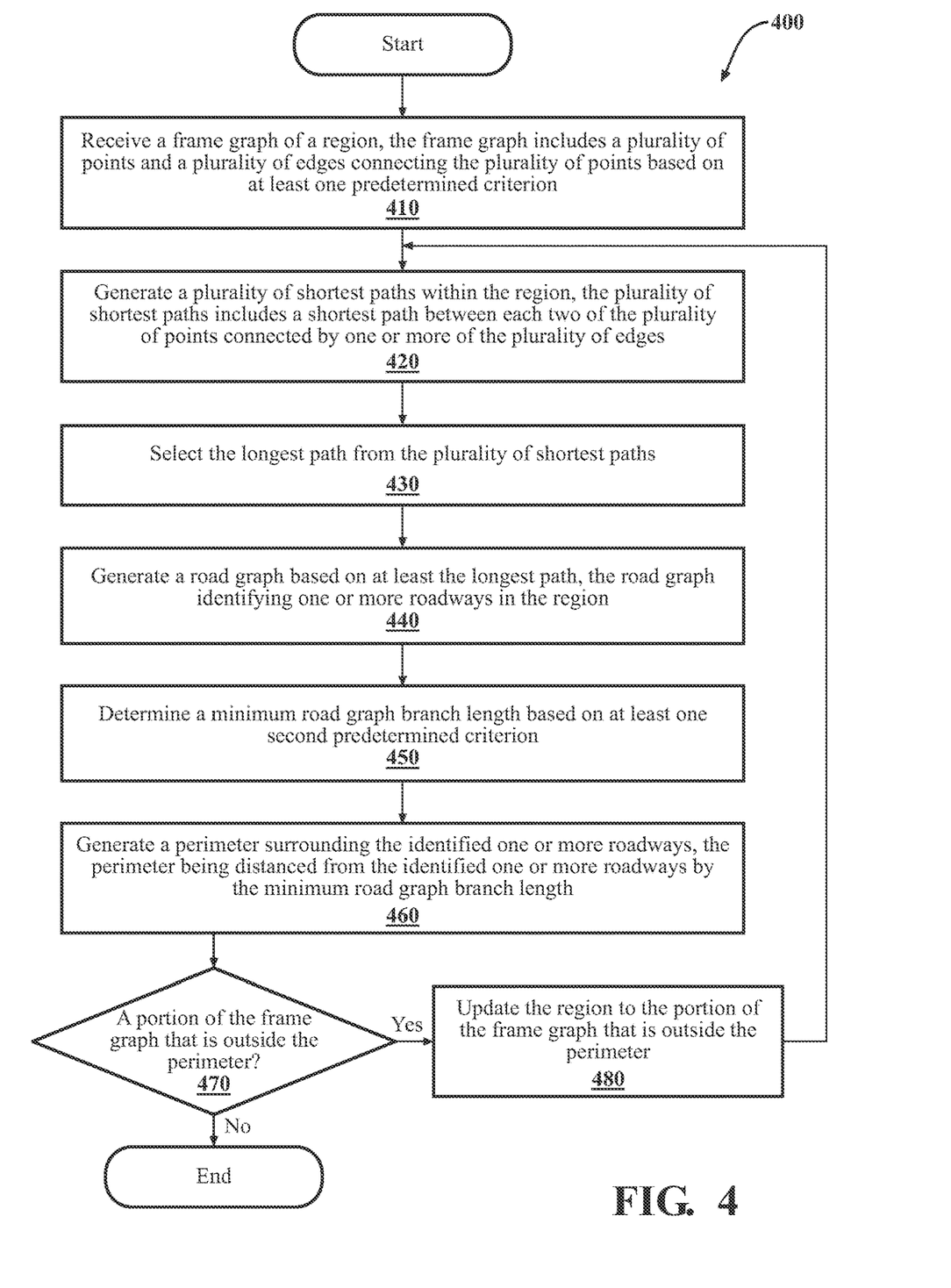
FIG. 4 is a flowchart illustrating another embodiment of a method associated with generating a road graph from a frame graph.

FIG. 4 is a flowchart illustrating another embodiment of a method 400 associated with generating a road graph 104 from a frame graph 102. The method 400 will be described from the viewpoint of the road graph generating system 100. However, the method 400 may be adapted to be executed in any one of several different situations and not necessarily by the road graph generating system 100. The method 400 includes steps 410 to 480. Steps 410 to 440 are similar to the steps 310 to 340 already described above respectively. As such, refer to steps 310 to 340 above for additional details for steps 410 to 440 respectively.

At step 410, the control module 230 may cause the processor(s) 210 to receive a frame graph 102 of a region and the frame graph 102 includes a plurality of points 106 and a plurality of edges 108 connecting the plurality of points 106 based on at least one predetermined criterion.

At step 420, the control module 230 may cause the processor(s) 210 to generate a plurality of shortest paths 112 within the region. In a case where the control module 230 may have previously generated the plurality of shortest paths 112, the control module 230 may reuse the previously generated plurality of shortest paths 112.

At step 430, the control module 230 may cause the processor(s) 210 to select the longest path 112a from the plurality of shortest paths 112.

At step 440, the control module 230 may cause the processor(s) 210 to generate a road graph 104 based on at least the longest path 112A, where the road graph 104 identifies one or more roadways 124 in the region.

At step 450, the control module 230 may cause the processor(s) 210 to determine a minimum road graph branch length based on at least one second predetermined criterion. As previously mentioned, the at least one second predetermined criterion may be based on a predetermined distance, one or more characteristics of one or more roadways in the region, and/or user input.

At step 460, the control module 230 may cause the processor(s) 210 to generate a perimeter surrounding the identified one or more roadways. As previously mentioned, the perimeter is distanced from the identified one or more roadways by the minimum road graph branch length. The control module 230 may utilize any suitable method to identify one or more of the plurality of points 106 that are within the perimeter.

At step 470, the control module 230 may cause the processor(s) 210 to determine whether a portion of the frame graph and more specifically, the plurality of points is outside the perimeter. If there is a portion of the frame graph 102 outside the perimeter, the next step is step 480. If there is no portion of the frame graph 102 outside the perimeter, the control module 230 outputs the road graph 104 as disclosed in step 440 to any suitable entity. The steps end.

At step 480, the control module 230 may cause the processor(s) 210 to update the region to the portion of the frame graph 102 that is outside the perimeter. The next step is step 420.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
 a processor; and
 a memory storing machine-readable instructions that, when executed by the processor, cause the processor to:
  receive a frame graph of a region, the frame graph includes a plurality of points and a plurality of edges connecting the plurality of points based on at least one predetermined criterion;
  generate a plurality of shortest paths, the plurality of shortest paths includes a shortest path between each two of the plurality of points connected by one or more of the plurality of edges;
  select one of the plurality of shortest paths as a longest path;
  generate a road graph based on at least the longest path, the road graph identifying one or more roadways in the region; and
  navigate a vehicle using an autonomous system and based on the road graph.

2. The system of claim 1, wherein the machine-readable instructions further include instructions that when executed by the processor cause the processor to:
 determine a minimum road graph branch length based on at least one second predetermined criterion;
 generate a perimeter surrounding the identified one or more roadways, the perimeter being distanced from the identified one or more roadways by the minimum road graph branch length;
 determine whether there is a portion of the frame graph that is outside the perimeter; and
 in response to whether there is a portion of the frame graph that is outside the perimeter:
  generate a second plurality of shortest paths, the second plurality of shortest paths includes a shortest path between each two of the plurality of points connected by the one or more of the plurality of edges, the each two of the second plurality of points are in the portion of the frame graph that is outside the perimeter;
  select one of the second plurality of shortest paths as the second longest path; and
  update the road graph based on at least the second longest path.

3. The system of claim 2, wherein the at least one second predetermined criterion is based on a predetermined distance.

4. The system of claim 2, wherein the at least one second predetermined criterion is based on one or more characteristics of one or more roadways in the region.

5. The system of claim 2, wherein the at least one second predetermined criterion is based on user input.

6. The system of claim 1, wherein the at least one predetermined criterion includes at least one of:
 two points having a common vehicle source;
 two points having a distance from each other that is less than a predetermined distance;
 two points having a gradient between each other that is less than a predetermined percentage;
 two points having fields of view that have an altitude difference that is less than a predetermined height; and
 two points having fields of view that have an overlapping portion and the overlapping portion is more than a predetermined value.

7. The system of claim 1, wherein each of the plurality of points is based on at least one of:
 a position of a vehicle along a roadway; or
 a representation of a field of view.

8. A method comprising:
 receiving a frame graph of a region, the frame graph includes a plurality of points and a plurality of edges connecting the plurality of points based on at least one predetermined criterion;
 generating a plurality of shortest paths, the plurality of shortest paths includes a shortest path between each two of the plurality of points connected by one or more of the plurality of edges;
 selecting one of the plurality of shortest paths as a longest path;
 generating a road graph based on at least the longest path, the road graph identifying one or more roadways in the region; and
 navigating a vehicle using an autonomous system and based on the road graph.

9. The method of claim 8, further comprising:
 determining a minimum road graph branch length based on at least one second predetermined criterion;
 generating a perimeter surrounding the identified one or more roadways, the perimeter being distanced from the identified one or more roadways by the minimum road graph branch length;
 determining whether there is a portion of the frame graph that is outside the perimeter; and
 in response to whether there is a portion of the frame graph that is outside the perimeter:
  generating a second plurality of shortest paths, the second plurality of shortest paths includes a shortest path between each two of the plurality of points connected by the one or more of the plurality of edges, the each two of the second plurality of points are in the portion of the frame graph that is outside the perimeter;
  selecting one of the second plurality of shortest paths as the second longest path; and
  updating the road graph based on at least the second longest path.

10. The method of claim 9, wherein the at least one second predetermined criterion is based on a predetermined distance.

11. The method of claim 9, wherein the at least one second predetermined criterion is based on one or more characteristics of one or more roadways in the region.

12. The method of claim 9, wherein the at least one second predetermined criterion is based on user input.

13. The method of claim 8, wherein the at least one predetermined criterion includes at least one of:
 two points having a common vehicle source;
 two points having a distance from each other that is less than a predetermined distance;
 two points having a gradient between each other that is less than a predetermined percentage;
 two points having fields of view that have an altitude difference that is less than a predetermined height; and
 two points having fields of view that have an overlapping portion and the overlapping portion is more than a predetermined value.

14. The method of claim 8, wherein each of the plurality of points is based on at least one of:
a position of a vehicle along a roadway; or
a representation of a field of view.

15. A non-transitory computer-readable medium including instructions that when executed by a processor cause the processor to:
receive a frame graph of a region, the frame graph includes a plurality of points and a plurality of edges connecting the plurality of points based on at least one predetermined criterion;
generate a plurality of shortest paths, the plurality of shortest paths includes a shortest path between each two of the plurality of points connected by one or more of the plurality of edges;
select one of the plurality of shortest paths as a longest path;
generate a road graph based on at least the longest path, the road graph identifying one or more roadways in the region; and
navigate a vehicle using an autonomous system and based on the road graph.

16. The non-transitory computer-readable medium of claim 15, wherein the instructions further include instructions that when executed by the processor cause the processor to:
determine a minimum road graph branch length based on at least one second predetermined criterion;
generate a perimeter surrounding the identified one or more roadways, the perimeter being distanced from the identified one or more roadways by the minimum road graph branch length;
determine whether there is a portion of the frame graph that is outside the perimeter; and
in response to whether there is a portion of the frame graph that is outside the perimeter:
generate a second plurality of shortest paths, the second plurality of shortest paths includes a shortest path between each two of the plurality of points connected by the one or more of the plurality of edges, the each two of the second plurality of points are in the portion of the frame graph that is outside the perimeter;
select one of the second plurality of shortest paths as the second longest path; and
update the road graph based on at least the second longest path.

17. The non-transitory computer-readable medium of claim 16, wherein the at least one second predetermined criterion is based on a predetermined distance.

18. The non-transitory computer-readable medium of claim 16, wherein the at least one second predetermined criterion is based on one or more characteristics of the one or more roadways in the region.

19. The non-transitory computer-readable medium of claim 16, wherein the at least one second predetermined criterion is based on user input.

20. The non-transitory computer-readable medium of claim 15, wherein the at least one predetermined criterion includes at least one of:
two points having a common vehicle source;
two points having a distance from each other that is less than a predetermined distance;
two points having a gradient between each other that is less than a predetermined percentage;
two points having fields of view that have an altitude difference that is less than a predetermined height; and
two points having fields of view that have an overlapping portion and the overlapping portion is more than a predetermined value.

* * * * *